UNITED STATES PATENT OFFICE.

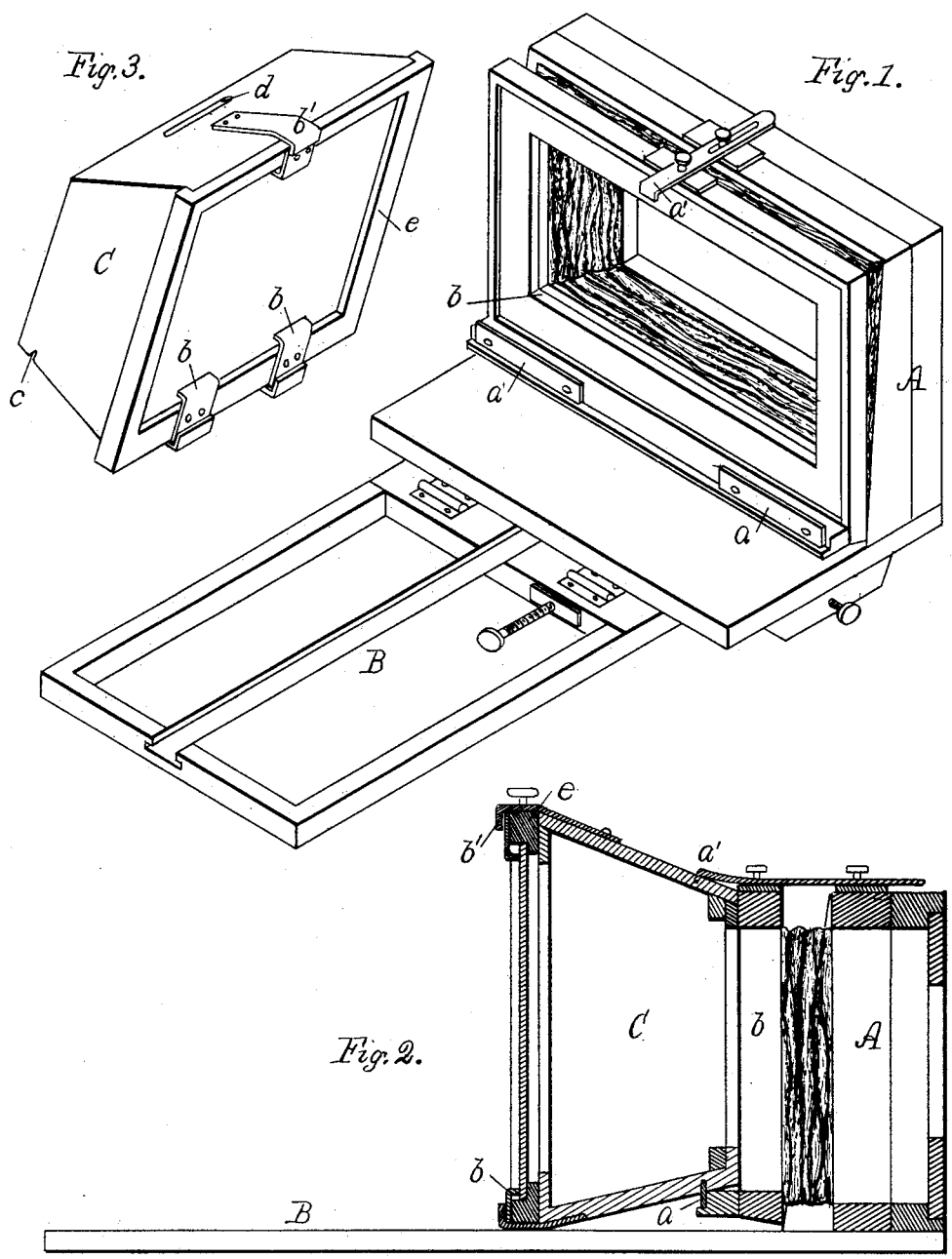

THOMAS H. BLAIR, OF CAMBRIDGE, ASSIGNOR TO THE BLAIR TOUROGRAPH AND DRY PLATE COMPANY, OF BOSTON, MASSACHUSETTS.

PHOTOGRAPHIC CAMERA.

SPECIFICATION forming part of Letters Patent No. 257,206, dated May 2, 1882.

Application filed January 14, 1882. (No model.)

*To all whom it may concern:*

Be it known that I, THOMAS HENRY BLAIR, a citizen of the United States, residing at Cambridge, in the county of Middlesex and State of Massachusetts, have invented certain new and useful Improvements in Photographic Cameras; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists in the employment, in combination with a photographic camera, of a bay or extension removable at will from the camera-box, and having a capacity for containing sensitized plates of larger or smaller size than those which the camera proper is adapted to receive, the rays of light from the lens passing through the permanent or normal plate-opening of said camera on their way to the plate in the removable extension.

The drawings accompanying this specification represent, in Figure 1, an isometric elevation of a camera of ordinary construction, and in Fig. 2 a section of a camera with my improvements added, the camera being of somewhat different construction from that shown in Fig. 1, while Fig. 3 is an isometric section of the extension which constitutes my invention.

In said drawings, A represents the box or body of a camera of ordinary construction, and B the base or frame which supports it upon the tripod, the catches upon the rear part for supporting the plate-holder being shown at $a$, $a$, $a'$, &c., and the opening in said rear part for admitting the rays of light to the plate in such holder being shown at $b$.

In carrying out my present improvements I provide a bay or extension, C, in the form a rectangular frame of wood or suitable material, the front side of which, upon the outside, is of a size or area to correspond with the rear part of the camera-box A, while the under side of the front of this extension C has a groove, $c$, to engage the catches $a$ $a$, before named, and its upper front side a similar groove, $d$, to engage the catch $a'$, the latter being adjustable in order to permit of ready attachment or removal of said extension to or from said box A.

The rear part of the extension C is provided with catches $b$ $b$ $b'$, similar to those upon the box A, such catches $b$ $b$ $b'$ being to support a plate-holder upon said extension.

It will be seen that the area $e$ of the extension C in rear is considerably larger than in front, the object of which is to permit the use, with the camera, of a sensitized plate of a size larger than the ordinary opening of the camera will permit. Therefore by the employment of the extension the capacity of the camera is increased. When the extension C is employed the rays of light from the lens pass through the ordinary or primary opening $b$ to the sensitized plate in said extension.

As shown in the accompanying drawings, the extension C has provision for containing but one-sized plate-holder; but as said extension is frusto-pyramidal or tapering in vertical cross-section grooves or slides may be added to it to enable plates or plate-holders of varying sizes to be applied to it.

It often becomes desirable in landscape photography to be able to take pictures of various sizes. Heretofore cameras have been restricted to plates of one size, and to obtain pictures of two or more sizes an equal number of cameras must be had. By means of my improvement the only extra expense requisite to obtain various-sized pictures is the cost of the extension C and its plate-holder, which is trifling.

I do not confine myself to the catches $a$ $a$ $a'$, as shown, as a means of confining the extension C to the body of the camera, as there are many details of construction not involving invention. In some instances it may be practicable and desirable to hinge the extension at bottom to the base or support B and retain the catch $a'$, or its equivalent, at top.

In lieu of the extension C being constructed to contain plates of a size larger than those permitted by the camera proper, the taper of such extension may be reversed—that is, it may be smaller in rear to contain a plate smaller than that taken by the camera—but in practical use this will hardly be found necessary or desirable. So, also, with regard to the form of the extension C, in lieu of its sides being rigid, as of wood, they may be composed of bellows of cloth or other flexible material, in order to permit the extension to fold compactly up to the box of the camera.

I claim—

1. In combination with a photographic camera, an extension, C, having its inner end smaller in cross-section than the interior of the body of the camera and flaring outwardly therefrom, so that its outer end is larger in cross-section than the body of the camera, substantially as and for the purposes set forth.

2. In a photographic camera, the combination of box or body A with the tapering extension C, hinged or removably attached thereto, substantially as shown.

In testimony whereof I affix my signature in presence of two witnesses.

THOMAS HENRY BLAIR.

Witnesses:
H. E. LODGE,
F. CURTIS.